United States Patent
Marconi et al.

(10) Patent No.: US 10,371,062 B2
(45) Date of Patent: Aug. 6, 2019

(54) TURBOSHAFT ENGINE, TWIN-ENGINE HELICOPTER EQUIPPED WITH SUCH A TURBOSHAFT ENGINE, AND METHOD FOR OPTIMISING THE ZERO-POWER SUPER-IDLE SPEED OF SUCH A TWIN-ENGINE HELICOPTER

(71) Applicant: SAFRAN HELICOPTER ENGINES, Bordes (FR)

(72) Inventors: Patrick Marconi, Gelos (FR); Romain Thiriet, Jurancon (FR); Olivier Bedrine, Bosdarros (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 248 days.

(21) Appl. No.: 15/128,060

(22) PCT Filed: Mar. 20, 2015

(86) PCT No.: PCT/FR2015/050699
§ 371 (c)(1),
(2) Date: Sep. 21, 2016

(87) PCT Pub. No.: WO2015/145043
PCT Pub. Date: Oct. 1, 2015

(65) Prior Publication Data
US 2017/0122221 A1    May 4, 2017

(30) Foreign Application Priority Data

Mar. 27, 2014    (FR) ...................................... 14 52645

(51) Int. Cl.
*F02C 7/268*    (2006.01)
*F02C 9/16*    (2006.01)
(Continued)

(52) U.S. Cl.
CPC ................ *F02C 9/16* (2013.01); *B64C 27/04* (2013.01); *B64D 27/14* (2013.01); *F02C 3/04* (2013.01);
(Continued)

(58) Field of Classification Search
CPC .... F02C 9/16; F02C 3/10; F02C 3/113; F02C 3/107; F02C 7/268; F02C 7/277; F05D 2270/023; F05D 2270/304
See application file for complete search history.

(56) References Cited

U.S. PATENT DOCUMENTS 3,660,976 A    5/1972    Canale
4,064,690 A *  12/1977   Kronogard .............. F02C 3/103
                                                        60/39.163
(Continued)

FOREIGN PATENT DOCUMENTS

GB        1201767         8/1970
WO    WO-2009118298      10/2009
WO    WO-2012059671       5/2012

OTHER PUBLICATIONS

International Search Report with English Language Translation, dated Jul. 7, 2015, PCT Application No. PCT/FR2015/050699.

*Primary Examiner* — Steven M Sutherland
(74) *Attorney, Agent, or Firm* — Womble Bond Dickinson (US) LLP

(57) ABSTRACT

The invention relates to a turboshaft engine comprising a gas generator (5) that is capable of being rotated, and a free turbine (6) that is rotated by the gases of said gas generator (5), characterized in that it comprises a device (20) for spontaneously mechanically coupling said gas generator (5) and said free turbine (6) that is capable of mechanically and spontaneously connecting said gas generator (5) and said free turbine (6) as soon as the ratio of the rotational speed (Continued)

Figure 1:
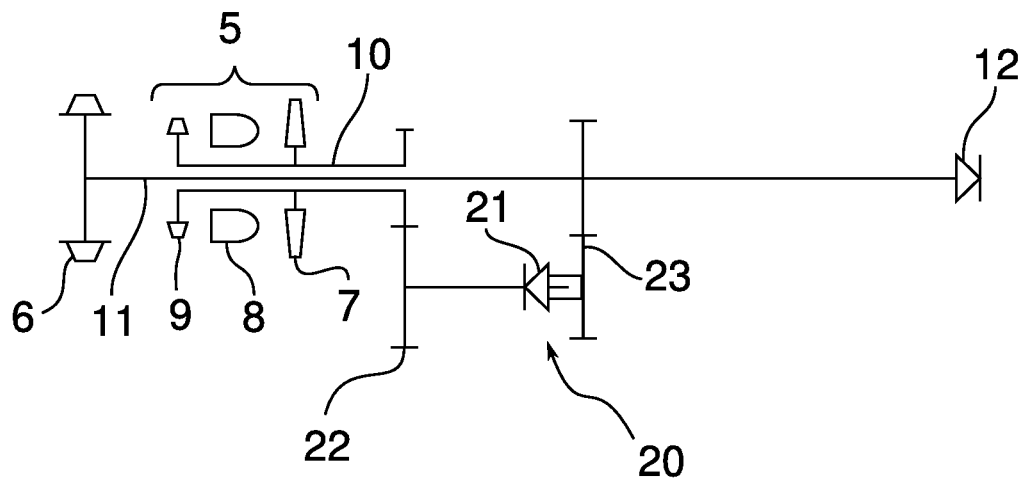

(NGG) of said gas generator to the rotational speed (NTL) of said free turbine reaches a predetermined threshold value.

4 Claims, 1 Drawing Sheet

(51) Int. Cl.
*F02C 3/10* (2006.01)
*F02C 3/113* (2006.01)
*B64C 27/04* (2006.01)
*B64D 27/14* (2006.01)
*F02C 3/04* (2006.01)

(52) U.S. Cl.
CPC ................ *F02C 3/10* (2013.01); *F02C 3/113* (2013.01); *F02C 7/268* (2013.01); *F05D 2220/329* (2013.01); *F05D 2270/023* (2013.01); *F05D 2270/304* (2013.01); *Y02T 50/671* (2013.01)

(56) References Cited

U.S. PATENT DOCUMENTS

| | | | |
|---|---|---|---|
| 4,870,817 A | 10/1989 | Conn | |
| 2007/0060442 A1* | 3/2007 | Ransbarger | F02C 7/36 477/53 |
| 2009/0116955 A1* | 5/2009 | Dauriac | F02C 3/10 415/144 |
| 2011/0097225 A1* | 4/2011 | Freund | F02C 1/02 417/423.5 |
| 2012/0277969 A1* | 11/2012 | Rossotto | F02C 3/10 701/100 |

* cited by examiner

TURBOSHAFT ENGINE, TWIN-ENGINE HELICOPTER EQUIPPED WITH SUCH A TURBOSHAFT ENGINE, AND METHOD FOR OPTIMISING THE ZERO-POWER SUPER-IDLE SPEED OF SUCH A TWIN-ENGINE HELICOPTER

1. TECHNICAL FIELD OF THE INVENTION

The invention relates to a turboshaft engine with which a twin-engine helicopter is intended to be equipped. The invention also relates to a method for optimising the zero-power super-idling mode of a twin-engine helicopter of this kind.

2. TECHNOLOGICAL BACKGROUND

A helicopter is generally provided with at least two turboshaft engines which operate at speeds that depend on the flight conditions of the helicopter. Throughout the following text, a helicopter is said to be in a cruise flight situation when it is progressing in normal conditions, during all the phases of the flight apart from transitional phases of take-off, ascent, landing or hovering flight. Throughout the following text, a helicopter is said to be in a critical flight situation when it is necessary for it to have available the total installed power, i.e. during the transitional phases of take-off, ascent, landing and the mode in which one of the turboshaft engines is malfunctioning, referred to by the abbreviation OEI (One Engine Inoperative).

It is known that when the helicopter is in a cruise flight situation, the turboshaft engines operate at low power levels, below their maximum continuous power (hereinafter MCT). In some configurations (forward speeds of less than the maximum speed, the helicopter not flying at the maximum mass, etc.), the power provided by the turboshaft engines during a cruise flight can be less than 50% of the maximum take-off power (hereinafter MTO). These low power levels result in a specific consumption (hereinafter SC), which is defined as the relationship between the hourly fuel consumption by the combustion chamber of the turboshaft engine and the mechanical power provided by said turboshaft engine, of greater than approximately 30% than the SC of the MTO, and thus in an overconsumption of fuel during cruise flight.

Finally, during holding phases on the ground, pilots generally prefer to put the various turboshaft engines into ground idling so as to be certain of being able to restart them. The turboshaft engines thus continue to consume fuel, despite not providing any power.

At the same time, the turboshaft engines are also oversized so as to be able to ensure flight over the entire flight range specified by the aircraft manufacturer, and in particular flight at high altitudes and during hot weather. These flight points, which are very restrictive, in particular when the helicopter has a mass that is close to its maximum take-off mass, are only encountered in specific use cases of some helicopters. As a result, although dimensioned so as to be able to provide such powers, some turboshaft engines will never fly in such conditions.

These oversized turboshaft engines are disadvantageous in terms of mass and fuel consumption. In order to reduce this consumption during cruise flight or during holding on the ground, it is possible to stop one of the turboshaft engines and to put it into a mode referred to as standby mode. The active engine or engines then operate at higher power levels in order to provide all the necessary power, and therefore at more favourable SC levels. However, this practice is contrary to the current certification rules, and turboshaft engines are not designed to ensure a level of restart reliability that is compatible with safety standards. Likewise, the pilots are not currently aware of or familiar with the idea of putting a turboshaft engine into standby mode during flight.

As is known, a turboshaft engine of a helicopter comprises a gas generator and a free turbine which is powered by the gas generator in order to provide power. The gas generator is conventionally made up of air compressors which are connected to a chamber for combusting the fuel in the compressed air, which chamber supplies hot gases to turbines for partially expanding gas, which turbines rotate the compressors by means of drive shafts. The gases then drive the free power transmission turbine. The free turbine transmits power to the rotor of the helicopter by means of a gearbox.

In FR1151717 and FR1359766, the applicants proposed methods for optimising the specific consumption of the turboshaft engines of a helicopter by the possibility of putting at least one turboshaft engine into a stable flight mode, referred to as continuous flight mode, and at least one turboshaft engine into a particular standby mode that it can leave in an emergency or in a normal manner, according to need. A transition out of standby mode is referred to as 'normal' when a change in the flight situation requires the turboshaft engine in standby to be activated, for example when the helicopter is going to transition from a cruise flight situation to a landing phase. A normal transition out of standby mode of this kind occurs over a period of between 10 seconds and 1 minute. A transition out of standby mode is referred to as 'emergency' when there is a failure or a power deficit in the active engine, or when the flight conditions suddenly become difficult. An emergency transition out of standby mode of this kind occurs over a period of less than 10 seconds.

The applicants have proposed in particular the following two standby modes:
- a standby mode referred to as normal super-idling, in which the combustion chamber is ignited and the shaft of the gas generator rotates at a speed of between 20 and 60% of the nominal speed,
- a standby mode referred to as assisted super-idling, in which the combustion chamber is ignited and the shaft of the gas generator rotates, with mechanical assistance, at a speed of between 20 and 60% of the nominal speed.

A disadvantage of the normal super-idling mode is the operating temperatures, which become increasingly high as attempts are made to reach ever lower idling.

The assisted super-idling mode makes it possible to remedy this problem of operating temperature. However, this requires the use of an electrical or pneumatic drive machine and of a corresponding coupling.

In addition, the technical problem now arises of achieving a super-idling mode which is not mechanically assisted but which is not limited by the temperatures of the turboshaft engine. The technical problem addressed is therefore that of providing a turboshaft engine that makes it possible to provide an improved super-idling mode of this kind.

3. AIMS OF THE INVENTION

The invention aims to provide a turboshaft engine that can have a super-idling mode, in which the combustion chamber is ignited and the shaft of the gas generator rotates at a speed of between 20 and 60% of the nominal speed, and that is not affected by the operating temperatures of the turboshaft engine or mechanically assisted by an external drive device.

The invention therefore aims to provide a turboshaft engine that can have a new super-idling mode.

The invention also aims to provide a twin-engine helicopter comprising at least one turboshaft engine according to the invention.

The invention also aims to provide a method for optimising the zero-power super-idling mode of a twin-engine helicopter according to the invention comprising at least one turboshaft engine according to the invention.

4. DISCLOSURE OF THE INVENTION

In order to achieve this, the invention relates to a turboshaft engine comprising a gas generator that is capable of being rotated, and a free turbine that is rotated by the gases of said gas generator, characterised in that it comprises a device for spontaneously mechanically coupling said gas generator and said free turbine, comprising at least one free wheel that connects a first shaft which, together with said gas generator, has a reduction ratio K1, and a second shaft which, together with the free turbine, has a reduction ratio K2, said free wheel being arranged such that said free turbine spontaneously drives said gas generator by means of said shafts and said free wheel as soon as the ratio of the rotational speed of said gas generator to the rotational speed of said free turbine is less than the ratio K2/K1.

A turboshaft engine according to the invention thus makes it possible to force the free turbine to drive the gas generator when predetermined conditions are reached. In other words, a turboshaft engine according to the invention that is provided with a device for spontaneously mechanically coupling the gas generator and the free turbine makes it possible to automatically switch the turboshaft engine from a configuration referred to as free-turbine to a configuration referred to as connected-turbine, without an external assistance and/or control device.

A turboshaft engine according to the invention can thus be put into a super-idling mode, during which the free turbine drives the gas generator, making it possible to reduce the temperatures of the hot parts of the turboshaft engine and to reduce the fuel consumption.

Furthermore, connected-turbine operation close to idling improves the transient performance, in particular in the event of a drop in the revolutions of the rotor during rapid pitching. This is because the gas generator then rotates at a speed that is greater than the speed required at zero power in free-turbine mode. The engine thus very rapidly produces a consequent power on the free turbine that corresponds to the value that the free-turbine turboshaft engine would have at this speed, plus the additional power resulting from rapidly reaching the acceleration limit, even before the gas turbine has started to accelerate.

Throughout the text, the term "shaft" denotes a means that is capable of being rotated and of transmitting a torque. It can therefore be a longitudinally extending shaft, but also simply a pinion gear.

The reduction ratios K1 and K2 are selected such that, when the ratio of the rotational speed of the gas generator to the rotational speed of the free turbine is greater than the ratio K2/K1, the turboshaft engine is in the free-turbine configuration, the gas generator and the free turbine not being mechanically connected. As soon as the ratio of the rotational speed of the gas generator to the rotational speed of the free turbine falls below the ratio K2/K1, the free turbine rotates the gas generator, and the turboshaft engine switches to a connected-turbine configuration.

Advantageously and according to the invention, said spontaneous mechanical coupling device is capable of mechanically and spontaneously connecting said gas generator and said free turbine when the ratio of the speeds is less than the ratio K2/K1, and of spontaneously separating said gas generator and said free turbine as soon as said ratio of speeds is greater than the ratio K2/K1.

Advantageously and according to the invention, the turboshaft engine comprises a starter-generator that is rigidly connected to an intermediate shaft, and said coupling device comprises two free wheels which connect said intermediate shaft to said first shaft which, together with said gas generator, has a reduction ratio K1, and to said second shaft, respectively, which second shaft, together with the free turbine, has a reduction ratio K2, said wheels being arranged such that said free turbine spontaneously drives said gas generator by means of said shafts and said free wheels as soon as the ratio of the speeds is less than the ratio K2/K1.

The invention also relates to a twin-engine helicopter comprising at least one turboshaft engine according to the invention.

The invention also relates to a method for optimising the zero-power super-idling mode of a twin-engine helicopter comprising at least one turboshaft engine comprising a gas generator that is capable of being rotated and a free turbine that is rotated by the gases of said gas generator, characterised in that it comprises a step of spontaneously mechanically coupling said gas generator and said free turbine by connecting, by means of a free wheel, a first shaft which, together with said gas generator, has a reduction ratio K1, and a second shaft which, together with the free turbine, has a reduction ratio K2, said free wheel being arranged such that said free turbine spontaneously drives said gas generator as soon as the ratio of the speeds is less than the ratio K2/K1.

Advantageously and according to the invention, the mechanical coupling is achieved by connecting, by means of a free wheel, a first shaft which, together with said gas generator, has a reduction ratio K1, and a second shaft which, together with the free turbine, has a reduction ratio K2, said free wheel being arranged such that said free turbine spontaneously drives said gas generator as soon as said ratio of the speeds is less than the ratio K2/K1.

Advantageously and according to the invention, the mechanical coupling is achieved by connecting, by means of two free wheels, an intermediate shaft, which is rigidly connected to a starter-generator, to said first shaft which, together with said gas generator, has a reduction ratio K1, and to said second shaft, respectively, which, together with the free turbine, has a reduction ratio K2, said wheels being arranged such that said free turbine spontaneously drives said gas generator as soon as said ratio of the speeds is less than the ratio K2/K1.

The invention also relates to a turboshaft engine, to a helicopter, and to a method for optimising the zero-power super-idling mode, characterised in combination by all or some of the features mentioned above or in the following.

5. LIST OF DRAWINGS

Figure 2:
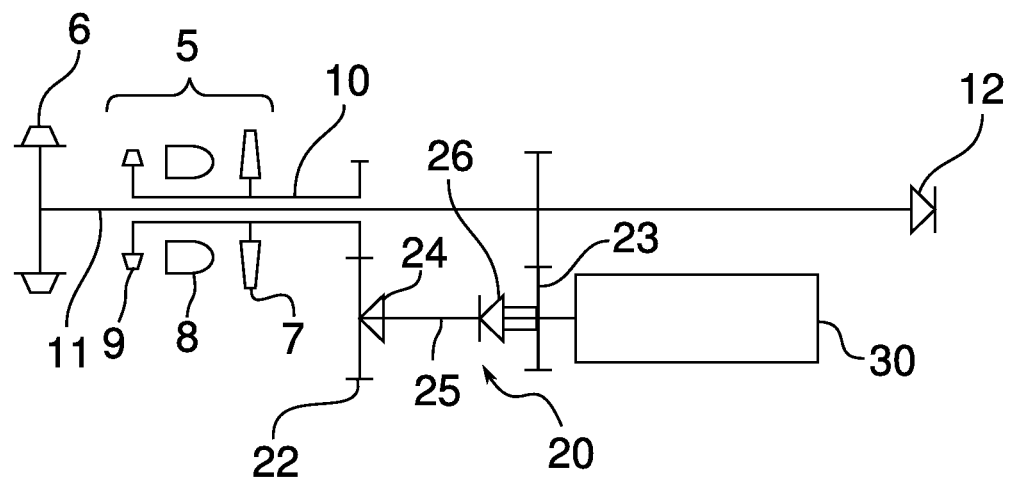

Other aims, features and advantages of the invention will emerge from reading the following description, which is given purely by way of non-limiting example and relates to the accompanying drawings, in which:

FIG. 1 is a schematic view of a turboshaft engine according to a first embodiment of the invention, FIG. 2 is a schematic view of a turboshaft engine according to a second embodiment of the invention.

6. DETAILED DESCRIPTION OF AN EMBODIMENT OF THE INVENTION

As shown in the drawings, a turboshaft engine according to the invention comprises a gas generator 5 and a free turbine 6 that is powered by the gas generator 5. As is known, a gas generator 5 comprises at least one air compressor 7 that is connected to a chamber 8 for combusting fuel in the compressed air and which supplies hot gases, and at least one turbine 9 for partially expanding gas, which turbine rotates the compressor 7 by means of a drive shaft 10. The gases then drive the free power transmission turbine 6. This free turbine 6 comprises a power transmission shaft 11 that is connected to a power transmission gearbox (not shown in the drawings) by means of a free wheel 12. This free wheel 12 makes it possible to prevent mechanical locking of the turboshaft engine from causing mechanical locking of the power transmission gearbox and, by extension, of the rotor of the helicopter on which said turboshaft engine is mounted.

A turboshaft engine according to the invention further comprises a device 20 for mechanically coupling the gas generator 5 and the free turbine 6, which device is capable of mechanically and spontaneously connecting the gas generator 5 and the free turbine 6 as soon as the ratio of the rotational speed of the shaft 10 of the gas generator 5 to the ratio of the rotational speed of the shaft 11 of the free turbine 6 is less than a predetermined threshold value, and of spontaneously separating the gas generator 5 and the free turbine 6 as soon as the ratio is above this predetermined threshold value.

According to a first embodiment, and as shown in FIG. 1, said coupling device 20 comprises a shaft 22 that is mechanically connected to the shaft 10 of the gas generator 5. Said shafts 22 and 10 have a reduction ratio between them of K1.

The coupling device 20 further comprises a shaft 23 that is mechanically connected to the shaft 11 of the free turbine 6. Said shafts 23 and 11 have a reduction ratio between them of K2.

The coupling device 20 further comprises a free wheel 21 that is connected between the shafts 22 and 23.

Therefore, the rotational speed of the shaft 22 is equal to K1.NGG, where NGG is the rotational speed of the shaft 10 of the gas generator 5.

The rotational speed of the shaft 23 is equal to K2.NTL, where NTL is the rotational speed of the shaft 11 of the free turbine 6.

The free wheel 21 is oriented such that the shaft 23 can drive the shaft 22 by means of said free wheel 21.

If the rotational speed of the shaft 23 is less than the rotational speed of the shaft 22, the two shafts are independent. Otherwise, the two shafts are connected.

In other words, the shafts are independent if the following equation is complied with: K2.NTL<K1.NGG. The shafts are thus independent if the ratio NGG/NTL>K2/K1.

If the speed ratio is less than or equal to K2/K1, an engine torque is thus transmitted from the free turbine 6 to the gas generator 5.

In other words, the coupling device 20 described in connection with FIG. 1 makes it possible to mechanically and spontaneously connect the gas generator 5 and the free turbine 6 when the ratio NGG/NTL is less than or equal to K2/K1, which ratio thus acts as a predetermined threshold value. The device also makes it possible to spontaneously separate the gas generator 5 and the free turbine 6 as soon as the ratio NGG/NTL exceeds K2/K1.

According to an embodiment, the values of K1 and K2 are 0.2567 and 0.2725, respectively.

According to a second embodiment, and as shown in FIG. 2, the turboshaft engine further comprises a starter-generator 30. In this case, the coupling device comprises, in addition to the shafts 22 and 23 described in connection with FIG. 1, an intermediate shaft 25 that is rigidly connected to the starter-generator 30.

The coupling device 20 further comprises a first free wheel 26 that connects the intermediate shaft 25 to the shaft 23. Said device further comprises a second free wheel 24 that connects the intermediate shaft 25 to the shaft 22.

In the same way as for the embodiment of FIG. 1, the rotational speed of the shaft 22 is equal to K1.NGG, and the rotational speed of the shaft 23 is equal to K2. NTL.

The free wheels 26, 24 are oriented such that the intermediate shaft 25 that is rigidly connected to the starter-generator 30 is capable of driving the shaft 22, and the shaft 23 is capable of driving the intermediate shaft 25 that is rigidly connected to the starter-generator 30.

The two free wheels 26, 24 drive simultaneously if the ratio NGG/NTL is equal to K2/K1.

If the ratio NGG/NTL is less than or equal to K2/K1, the shafts 10, 11 are thus mechanically connected and an engine torque is transmitted from the free turbine 6 to the gas generator 5.

If the ratio NGG/NTL is greater than K2/K1, the shafts are thus mechanically independent.

The starter-generator 30 is either driven by the free turbine (when functioning as a generator) or drives the gas generator (when functioning as a starter). The device thus also ensures the GG-TL (gas generator-free turbine) automatic switching function that consists in coupling the starter-generator 30 to the gas generator during start-up and to the shaft 11 of the free turbine when functioning as a generator.

In other words, the coupling device 20 described in connection with FIG. 2 also makes it possible to mechanically and spontaneously connect the gas generator 5 and the free turbine 6 when the ratio NGG/NTL is less than or equal to K2/K1. The device also makes it possible to spontaneously separate the gas generator 5 and the free turbine 6 as soon as the ratio NGG/NTL exceeds K2/K1. Furthermore, the generator and/or starter function is possible in this embodiment.

The invention also relates to a method for optimising the zero-power super-idling mode of a twin-engine helicopter comprising at least one turboshaft engine according to one of the embodiments described.

A method of this kind thus comprises a step of spontaneously mechanically coupling the gas generator 5 and the free turbine 6 as soon as the ratio of the rotational speed of the gas generator to the rotational speed of the free turbine reaches the value K2/K1.

A method according to the invention is advantageously implemented by a turboshaft engine according to one of the embodiments described. A turboshaft engine according to one of the embodiments described advantageously implements a method according to the invention.

The invention claimed is:
1. A turboshaft engine comprising a gas generator that is capable of being rotated, and a free turbine that is rotated by gases of said gas generator, wherein said turboshaft engine comprises a device for spontaneously mechanically cou- pling said gas generator and said free turbine, comprising at least one free wheel that connects a first shaft which, together with said gas generator, has a reduction ratio K1, and a second shaft which, together with the free turbine, has a reduction ratio K2, said at least one free wheel being arranged such that said free turbine spontaneously drives said gas generator by means of said first and second shafts and said at least one free wheel as soon as a ratio of a rotational speed of said gas generator to a rotational speed of said free turbine is less than the ratio K2/K1, and wherein the turboshaft engine comprises a starter-generator that is rigidly connected to an intermediate shaft, and wherein said device for spontaneously mechanically coupling comprises two free wheels which connect said intermediate shaft to said first shaft, and to said second shaft, respectively, said two free wheels being arranged such that said free turbine spontaneously drives said gas generator by means of said first and second shafts and said two free wheels when said ratio of the rotational speed of said gas generator to the rotational speed of said free turbine is less than the ratio K2/K1.

2. The turboshaft engine according to claim 1, wherein said device for spontaneously mechanically coupling is capable of mechanically and spontaneously connecting said gas generator and said free turbine as soon as the ratio of the rotational speed of said gas generator to the rotational speed of said free turbine is less than the ratio K2/K1, and of spontaneously separating said gas generator and said free turbine as soon as said ratio of the rotational speed of said gas generator to the rotational speed of said free turbine is greater than the ratio K2/K1.

3. A twin-engine helicopter, comprising at least one turboshaft engine according to claim 1.

4. A method for optimizing a zero-power super-idling mode of a twin-engine helicopter comprising at least one turboshaft engine comprising a gas generator that is capable of being rotated and a free turbine that is rotated by gases of said gas generator, wherein said method comprises a step of spontaneously mechanically coupling said gas generator and said free turbine by connecting a first shaft which, together with said gas generator, has a reduction ratio K1, and a second shaft which, together with the free turbine, has a reduction ratio K2, by means of a free wheel, said free wheel being arranged such that said free turbine spontaneously drives said gas generator when a ratio of a rotational speed of said gas generator to a rotational speed of said free turbine is less than the ratio K2/K1, and wherein said spontaneously mechanical coupling is achieved by connecting, by two free wheels, an intermediate shaft, which is rigidly connected to a starter-generator, to said first shaft and to said second shaft, respectively, said two free wheels being arranged such that said free turbine spontaneously drives said gas generator when said ratio of the rotational speed of said gas generator to the rotational speed of said free turbine is less than the ratio K2/K1.

* * * * *